United States Patent
Yamaguchi et al.

(10) Patent No.: US 7,864,671 B2
(45) Date of Patent: Jan. 4, 2011

(54) CONNECTION CONTROL APPARATUS, CONNECTION CONTROL METHOD, AND PROGRAM

(75) Inventors: Kensaku Yamaguchi, Yokohama (JP); Shinya Murai, Yokohama (JP); Junko Ami, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 901 days.

(21) Appl. No.: 11/232,893

(22) Filed: Sep. 23, 2005

(65) Prior Publication Data
US 2006/0072544 A1 Apr. 6, 2006

(30) Foreign Application Priority Data
Sep. 24, 2004 (JP) .............. P2004-278263

(51) Int. Cl.
*G01R 31/08* (2006.01)
*H04L 1/00* (2006.01)
*G06F 15/167* (2006.01)

(52) U.S. Cl. .............. 370/229; 370/230; 370/252; 370/352; 370/401; 709/204; 709/225; 713/162; 713/323

(58) Field of Classification Search ............... 370/229, 370/230, 231, 252, 351, 352, 389, 401; 714/39; 713/162, 201, 323; 709/203, 204, 225
See application file for complete search history.

(56) References Cited

U.S. PATENT DOCUMENTS 6,526,507 B1 * 2/2003 Cromer et al. .............. 713/162

2002/0083191 A1 * 6/2002 Ryuutou et al. .............. 709/237
2002/0085569 A1 * 7/2002 Inoue ........................ 370/401
2002/0120886 A1 * 8/2002 Nguyen et al. ................ 714/39
2005/0041596 A1 * 2/2005 Yokomitsu et al. .......... 370/252

(Continued)

FOREIGN PATENT DOCUMENTS

JP 60-116267 6/1985

(Continued)

OTHER PUBLICATIONS

Notification of Reasons for Refusal issued by the Japanese Patent Office on Aug. 17, 2007, for Japanese Patent Application No. 2004-278263, and English-language translation thereof.

(Continued)

Primary Examiner—Aung S Moe
Assistant Examiner—Jamal Javaid
(74) Attorney, Agent, or Firm—Finnegan, Henderson, Farabow, Garrett & Dunner, L.L.P.

(57) ABSTRACT

A connection control apparatus includes a monitoring unit, a determining unit, a transferring unit, and a notifying unit. The monitoring unit monitors a status of a communication terminal. The determining unit determines, on a basis of a monitoring result, whether or not the communication terminal is able to respond to a connection request therefor. The transferring unit transfers the connection request to the communication terminal when the transferring unit has received a connection request for the communication terminal and the determining unit determines that the communication terminal is able to respond to the connection request. The notifying unit calls attention around the connection control apparatus when the determining unit determines that the communication terminal is unable to respond to the connection request after the transferring unit has received the connection request.

13 Claims, 10 Drawing Sheets

U.S. PATENT DOCUMENTS

2005/0243761 A1* 11/2005 Terry et al. ............... 370/328
2006/0067310 A1    3/2006 Murai

FOREIGN PATENT DOCUMENTS

| JP | 63-80695   | 4/1988  |
|----|------------|---------|
| JP | 4-288755   | 10/1992 |
| JP | 05-199303  | 8/1993  |
| JP | 6-177981   | 6/1994  |
| JP | 11-88515   | 3/1999  |
| JP | 2002-237906| 8/2002  |
| JP | 2003-8606  | 1/2003  |

OTHER PUBLICATIONS

Notification of Reason for Refusal issued by the Japanese Patent Office on Jan. 23, 2009, for Japanese Patent Application No. 2004-278263, and English-language translation thereof.

Decision of Refusal issued by the Japanese Patent Office on Jul. 24, 2009, for Japanese Patent Application No. 2004-278263, and English-language translation thereof (5 pages).

* cited by examiner

US 7,864,671 B2

CONNECTION CONTROL APPARATUS, CONNECTION CONTROL METHOD, AND PROGRAM

This application is based upon and claims the benefit of priority from the prior Japanese Patent Application No. 2004-278263 filed on Sep. 24, 2004; the entire contents of which are incorporated herein by reference.

BACKGROUND OF THE INVENTION

1. Field of the Invention

This invention relates to a connection control apparatus for controlling acceptance of an incoming call from a caller and in particular to a method of taking steps when a call is made in a state where an incoming call cannot be accepted.

2. Description of the Related Art

In recent years, the real-time communication field in which a caller calls a callee for conducting real-time communications as demanded has been diversified. Not only real-time communications implemented using videophones capable of sending video together with voice in addition to conventional telephones capable of sending only voice, but also those on an IP network for making it possible to transfer audio, video, and data are becoming realistic.

Accordingly, the types of communication terminals have also been diversified. Not only dedicated terminals specialized only for voice conversation such as conventional telephones, but also general-purpose machines such as personal computers are used as communication terminals. With the dedicated terminal such as a conventional telephone, a standby state is always maintained and a response can be returned immediately when a call is received.

However, in the case of using a personal computer, etc. as a communication terminal, the communication terminal is not necessarily placed in a state where it can accept call. For example, when the personal computer is powered off, is in a resume mode or is placed out of the service area if a radio medium such as a radio LAN is used as a communication line, even if a called user can respond to call, the user can not necessarily deal immediately with call from any caller at any moment.

To prepare for such a case, an Internet telephone unit for notifying a user of an incoming call if at least the called machine recognizes that the machine is called, and cannot receive the call for some reason has been proposed (JP 2002-237906 A).

BRIEF SUMMARY OF THE INVENTION

A communication machine that cannot always enter a standby mode to establish communications in real time, such as a personal computer, would be unable to recognize that the machine is called and would be unable to receive the call in some cases. The invention enables a communication terminal that cannot always be in a standby state to respond to a call in real time.

According to one aspect of the invention, a connection control apparatus includes a monitoring unit, a determining unit, a transferring unit, and a notifying unit. The monitoring unit is configured to monitor a status of a first communication terminal. The determining unit is configured to determine, on a basis of a monitoring result, as to whether or not the first communication terminal is able to respond to a connection request destined therefor. The transferring unit is configured to receive the connection request destined for the first communication terminal. The transferring unit is configured to transfer the connection request destined for the first communication terminal when the transferring unit has received the connection request and the determining unit determines that the first communication terminal is able to respond to the connection request. The notifying unit is configured to call attention around the connection control apparatus when the transferring unit has received the connection request and the determining unit determines that the first communication terminal is unable to respond to the connection request.

According to another aspect of the invention, a method for controlling a connection request and a program implementing the connection control apparatus as a computer are provided.

The invention enables a communication terminal that is not always in a standby state to respond to a call made at irregular intervals in real time.

DETAILED DESCRIPTION OF THE INVENTION

Referring now to the accompanying drawings, preferred embodiments of the invention will be described.

First Embodiment

Figure 1:
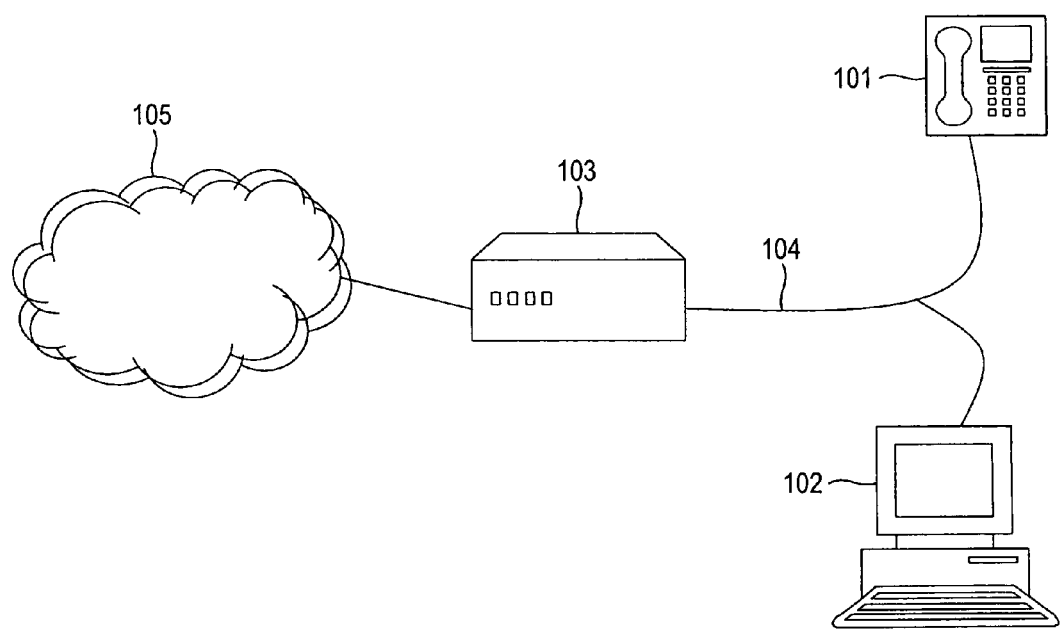
FIG. 1 is a drawing to show a configuration example of a real-time communication system of a first embodiment.

FIG. 1 is a drawing to show a configuration example of a real-time communication system according to a first embodiment of the invention. FIG. 1 shows a telephone 101, a personal computer 102, a connection control apparatus 103, a home LAN 104, and the Internet 105.

The telephone 101 is a telephone having an IP telephone function, for example. The telephone 101 is connected to the Internet 105 through the home LAN 104 and enables a user to make conversation with another user of any other telephone.

The personal computer 102 is a generally used personal computer, for example, and includes interfaces with external devices, such as a display screen, a keyboard, a speaker, and a microphone.

Upon receiving a call to the telephone 101 or the personal computer 102 through the Internet 105, the connection control apparatus 103 has a function of checking connection destinations of this received call and transferring the received calls to the respective connection destinations. If communications are established in response to the call, the connection control apparatus 103 relays communications between the called communication terminal (for example, the telephone 101) and the calling communication terminal. In contrast, when a call is made from the telephone 101 or the personal computer 102 to a communication terminal on the Internet 105, the connection control apparatus 103 transfers the call and relays communications with the communication terminal. Alternatively, if one of the telephone 101 and the personal computer 102 calls the other, the connection control apparatus 103 also transfers the call and relays communications therebetween after the communications are established.

Further, the connection control apparatus 103 monitors a status of the telephone 101 and a status of the personal computer 102, and determines as to whether or not each of the telephone 101 and personal computer 102 can accept a call from another communication terminal. The connection control apparatus 103 includes a notification device, such as a lamp or a buzzer, for notifying the user of a call, if the connection control apparatus 103 determines that a called communication terminal cannot accept a call when it is called.

The home LAN 104 is a communication medium for communicating with machines such as the telephone 101 and the personal computer 102 installed at home; for example, a network connected by a wired LAN. The home LAN 104 is not limited to the example mentioned here; it may be a radio LAN conforming to IEEE 802.11b standard or a radio LAN of any other standard so long as it enables the connection control apparatus 103 and another home communication terminal to communicate with each other.

The Internet 105 is assumed to be a wide-area network that can be used by anyone, but may be a network such as an intracompany LAN.

Figure 2:
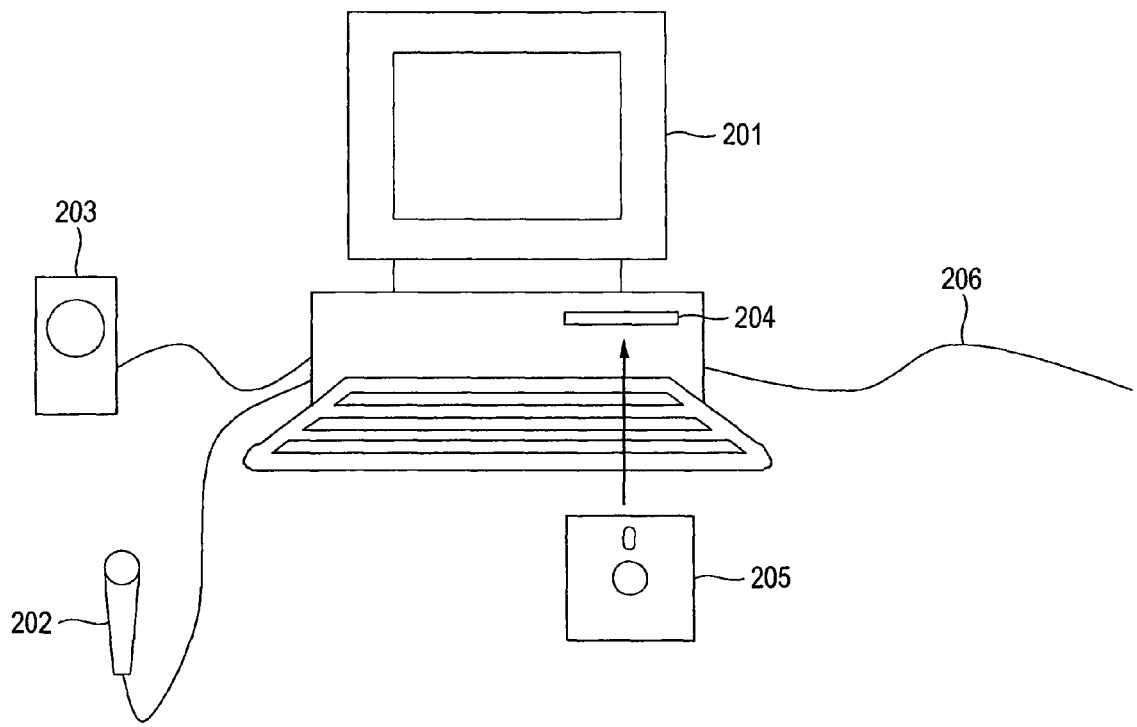
FIG. 2 is a drawing to show an example of a personal computer of the first embodiment.

FIG. 2 shows an example of the personal computer 102 in this embodiment. FIG. 2 shows a display 201, a microphone 202, a speaker 203, a floppy (R) disk drive 204, a floppy (R) disk 205, and a network cable 206.

The personal computer 102 can provide various functions, by reading and installing a program stored on the floppy (R) disk 205 through the floppy (R) disk drive 204. The personal computer 102 can be used not only as a usual personal computer, but also as a telephone using the microphone 202 and the speaker 203, for example. Further, the personal computer 102 can also be used as a videoconference communication terminal by displaying a moving image on the display 201 in real time.

Figure 3:
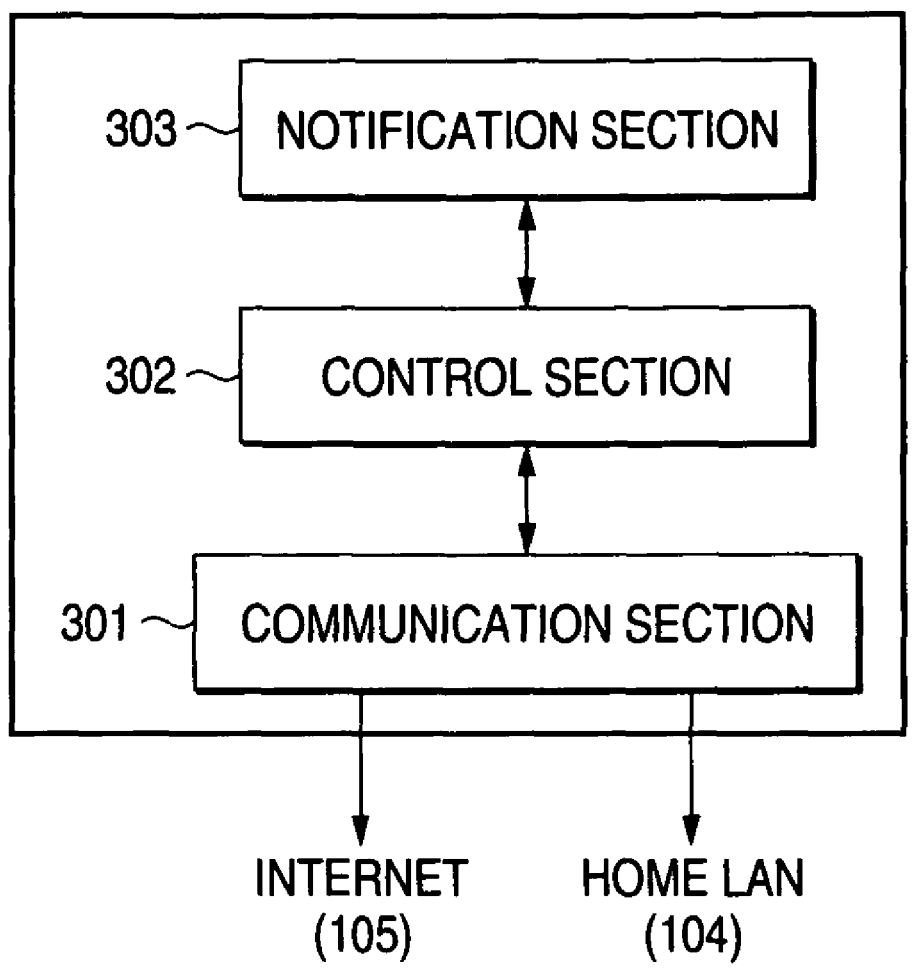
FIG. 3 is a drawing to show an example of a block diagram of a connection control apparatus of the first embodiment.

FIG. 3 is a drawing to show an example of a block diagram of the connection control apparatus 103 in the embodiment. FIG. 3 shows a communication section 301, a control section 302, and a notification section 303.

The communication section 301 has a function of allowing the connection control apparatus 103 to communicate with another communication terminal through the Internet 105 or the home LAN 104, and a function of connecting/disconnecting communications therebetween.

The control section 302 has a function of controlling the whole connection control apparatus 103. The control section 302 analyzes a connection destination of a call received by the communication section 301, and transfers the received call to a communication terminal, which is the connection destination, through the communication section 301. When communications terminate, the control section 302 instructs the communication section 301 to disconnect the communications. Further, the control section 302 monitors the status of each home communication terminal (for example, telephone 101 and personal computer 102) through the communication section 301. The control section 302 controls the notification section 303 so as to produce predetermined display based on the monitoring result and a call for each home communication terminal.

The notification section 303 has a function of lighting an installed lamp or causing an installed buzzer to sound so that the attention of the user can be attracted, for example.

Figure 4:
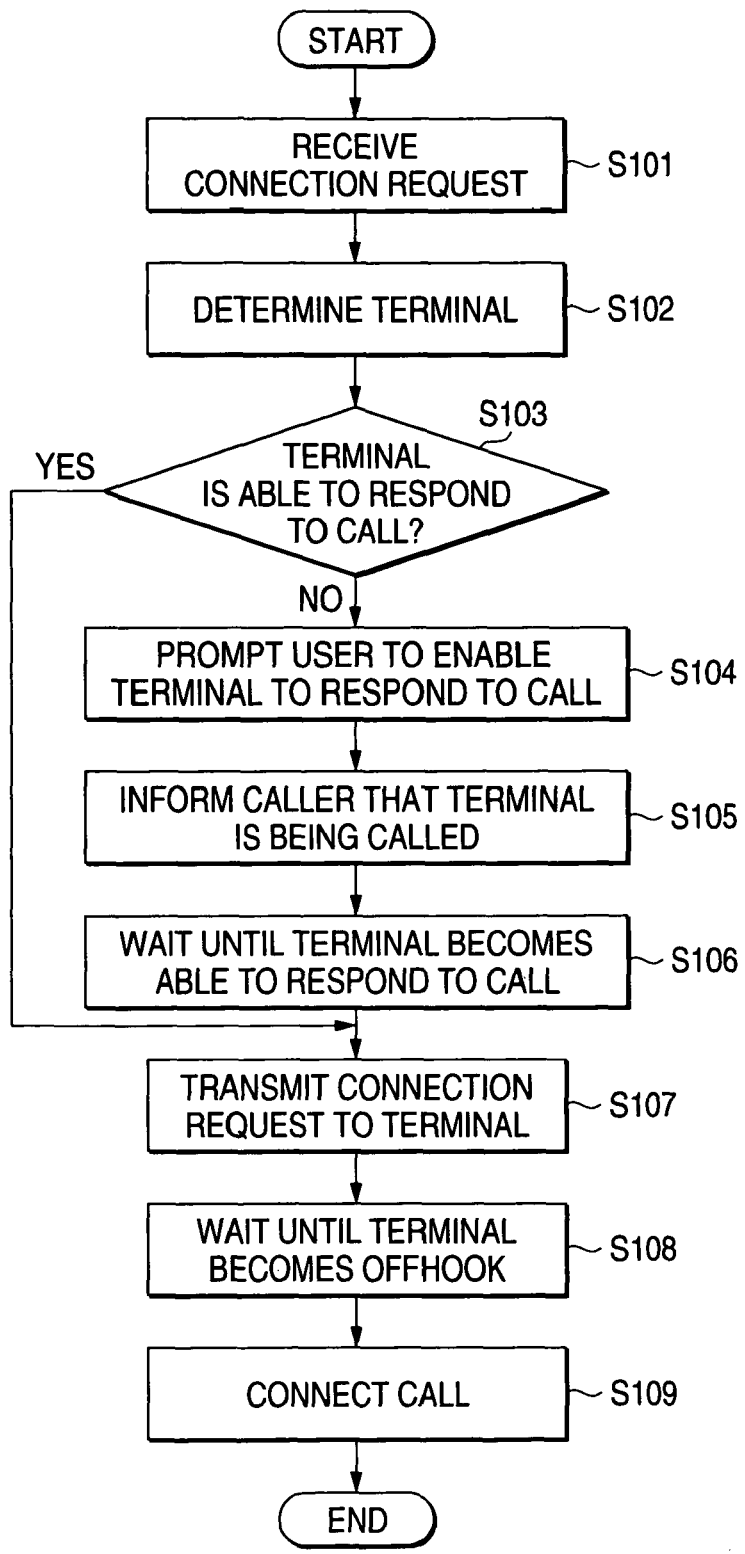
FIG. 4 is a drawing to show an example of a flowchart of the connection control apparatus of the first embodiment.

FIG. 4 is a drawing to show an example of a flowchart of the connection control apparatus 103 in the embodiment.

First, the communication section 301 receives a connection request in the form of a call from any communication terminal (step S101). The control section 302 analyzes the connection request and determines the called communication terminal (i.e., connection destination) (step S102). If the determined connection destination is improbable, the call may be terminated. Next, whether or not the communication terminal determined from the connection request can respond to the call is determined based on the monitoring result of the control section 302 (step S103). Status of each communication terminal monitored by the control section 302 may include a status as to whether or not each communication terminal is connected to the network in the physical layer in the used communication medium, a status as to whether or not the called communication terminal responds to an existence check signal sent thereto, a status as to whether if the connection request requires a predetermined procedure between communication terminals such as conversation, an application for processing the procedure is ready or not, etc. If the called communication terminal (connection destination) in the current circumstances is in a state where it cannot accept the connection request, it is determined that the communication terminal cannot respond to the call.

If it is determined at step S103 that the communication terminal cannot respond to the call, the notification section 303 draws the user's attention so as to change the called communication terminal to be able to respond to the call (step S104). Specifically, the notification section 303 lights the lamp, causes the beeper to sound, etc., for notifying the user that the communication terminal cannot respond to the call although the communication terminal is called. The notified user may recognize the reason why the communication terminal cannot respond to the call and may perform operation of turning on the power, starting up the application, etc. Preferably, the communication terminal has a function of automatically turning on the power such as Wake on LAN, whereby the communication terminal can be reliably placed in a respondable state without the intervention of the user.

The caller is informed that the communication terminal is being called at present (step S105) and the connection control apparatus 103 waits until the called communication terminal becomes able to respond to the call (step S106). When the control section 302 detects that the called communication terminal becomes able to respond to the call, the control section 302 transmits the call to the called communication terminal (step S107).

Then, the connection control apparatus 103 waits until the called communication terminal accepts the call (step S108). Accepting the call may be represented as "being in a off-hook state" or "hooking" in imitation of a telephone line.

When the called communication terminal accepts the call, the call is connected thereto and the calling procedure is terminated (step S109).

On the other hand, if it is determined at step S103 that the communication terminal can respond to the call, the called communication terminal can already respond to the call and thus step S104 is skipped and the process jumps to step S107 for transmitting the connection request to the communication terminal and performing the subsequent steps.

According to this flowchart, even if a communication terminal is not always in a standby state, the user is notified of the call (connection request) so as to enable connection. Therefore, the user can respond to a call made at irregular intervals in real time.

Second Embodiment

In a second embodiment of the invention, a function of redialing a caller is added to the connection control apparatus 103 of the first embodiment.

FIG. 1 is a drawing to show a configuration example of a real-time communication system according to the second embodiment of the invention. The description is similar to that in the first embodiment, and therefore will not be given again.

FIG. 2 shows an example of a personal computer 102 of the second embodiment. The description is similar to that in the first embodiment, and therefore will not be given again.

Figure 5:
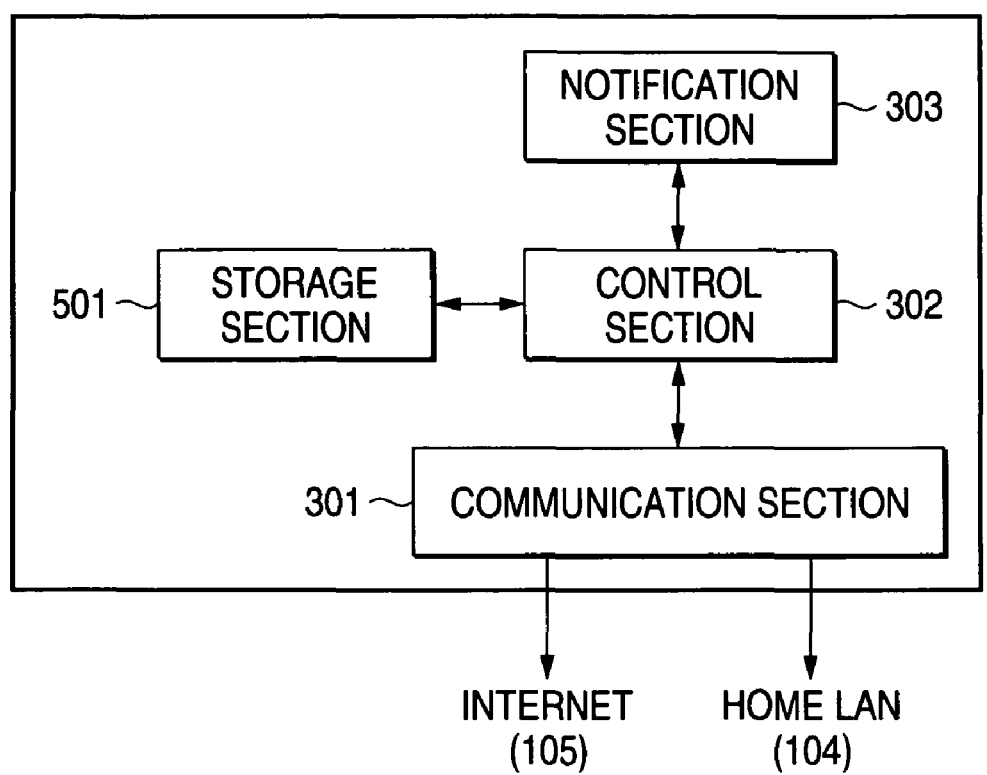
FIG. 5 is a drawing to show an example of a block diagram of a connection control apparatus of a second embodiment.

FIG. 5 shows an example of a block diagram of a connection control apparatus 103 of the second embodiment.

FIG. 5 shows a communication section 301, a control section 302, a notification section 303, and a storage section 501.

The communication section 301 has a function of allowing the connection control apparatus 103 to communicate with a different communication terminal through Internet 105 or the home LAN 104 and a function of connecting/disconnecting communications.

The control section 302 has a function of controlling the whole connection control apparatus 103. The control section 302 determines a communication terminal to which a call received by the communication section 301 is to be connected, and transfers the call to the called communication terminal through the communication section 301. When communications terminate, the control section 302 instructs the communication section 301 to disconnect the communications. Further, the control section 302 monitors a status of each home communication terminal (for example, telephone 101, personal computer 102) through the communication section 301, and controls the notification section 303 so as to produce predetermined display based on the monitoring result and calling for each home communication terminal. Alternatively, the control section 302 accepts the call as proxy for the called communication terminal and acquires and stores the identification information of the caller.

The notification section 303 has a function of lighting an installed lamp or causing an installed beeper to sound so the user's attention can be attracted, for example.

The storage section 501 has a function of storing the identification information acquired by the control section 302 from the communication terminal of the caller.

Figure 6:
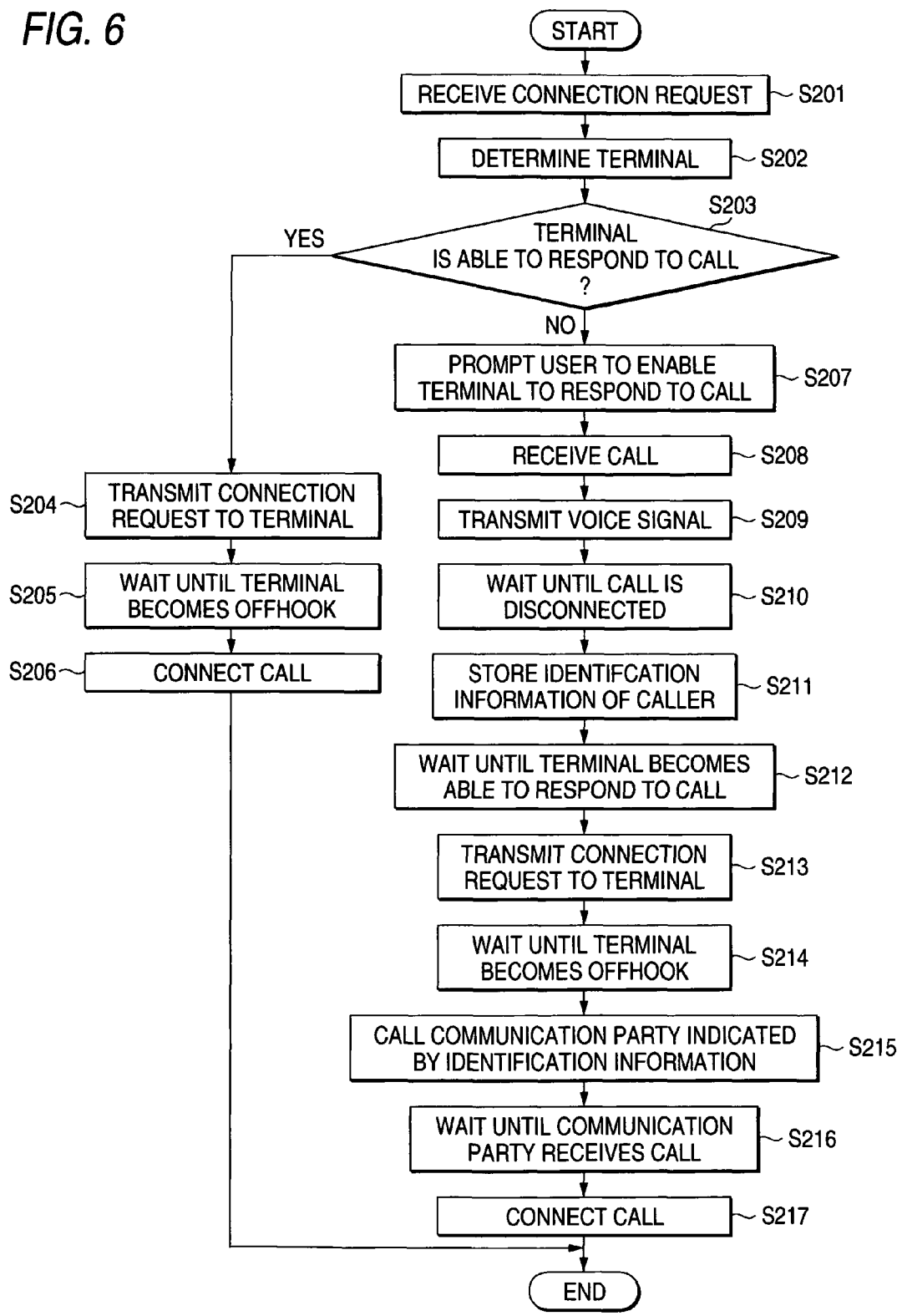
FIG. 6 is a drawing to show an example of a flowchart of the connection control apparatus of the second embodiment.

FIG. 6 is a drawing to show an example of a flowchart of the connection control apparatus 103 in the second embodiment.

First, a connection request is received in the communication section 301 in the form of a call from any communication terminal (step S201). The control section 302 analyzes the connection request and determines a called communication terminal (step S202). If the determined called communication terminal is improbable, the call may be terminated. Next, whether or not the communication terminal determined from the connection request can respond to the call is determined based on the monitoring result of the control section 302 (step S203). Status of each communication terminal monitored by the control section 302 may include a status as to whether or not each communication terminal is connected to the network in the physical layer in the used communication medium, a status as to whether or not the called communication terminal responds to an existence check signal sent thereto, a status as to whether if the connection request requires a predetermined procedure between communication terminals such as conversation, an application for processing the procedure is ready or not, etc. If the called communication terminal (connection destination) in the current circumstances is in a state where it cannot accept the connection request, it is determined that the communication terminal cannot respond to the call.

If it is determined at step S203 that the communication terminal cannot respond to the call, the notification section 303 draws the user's attention so as to change the called communication terminal to be able to respond to the call (step S207). Specifically, the notification section 303 lights the lamp, causes the beeper to sound, etc., for notifying the user that the communication terminal cannot respond to the call although the communication terminal is called. The notified user may recognize the reason why the communication terminal cannot respond to the call and may perform operation of turning on the power, starting up the application, etc. Preferably, the communication terminal has a function of automatically turning on the power such as Wake on LAN, whereby the communication terminal can be reliably placed in a respondable state without the intervention of the user.

Next, the control section 302 accepts the call instead of the called communication terminal (step S208) and sends a voice signal to the caller for making an announcement so as to request the caller to once disconnect the call (step S209). The control section 302 waits for the caller to disconnect the call in accordance with the announcement (step S210), and stores the identification information of the caller in the storage section 501 (step S211). At this time, the connection control apparatus 103 may disconnect the call made by the caller.

Continuously, the control section 302 waits until the called communication terminal becomes able to respond to the call (step S212). When the control section 302 detects that the called communication terminal becomes able to respond to the call, the control section 302 transmits the call to the called communication terminal (step S213).

Then, the control section 302 waits until the called communication terminal accepts the call (step S214). Accepting the call may be represented as "being in a off-hook state" or "hooking" in imitation of a telephone line.

In response to the fact that the called communication terminal has become able to respond to the call, the control section 302 calls the communication terminal indicated by the identification information of the caller stored in the storage section 501 (step S215). The control section 302 waits until the communication terminal indicated by the identification information receives the call (step S216) and then connects the call from the caller and the call for the connection destination so that they can communicate with each other (step S217) and the calling procedure is terminated.

On the other hand, if it is determined at step S203 that the determined communication terminal can respond to the call, since the called communication terminal is ready to respond to the call, step S207 is skipped and the process jumps to step S204 for transmitting the connection request to the communication terminal and the subsequent steps.

According to this flowchart, even if a communication terminal is not always in a standby state, the user is notified of the call (connection request) so as to enable connection. Therefore, the user can respond to a call made at irregular intervals in real time. Furthermore, the caller is not made to wait with continuation of the calling.

Third Embodiment

When one communication is established using a plurality of communication terminals, a third embodiment of the invention enables the connection control apparatus 103 of the first embodiment to connect a call to each communication terminal.

Figure 7:
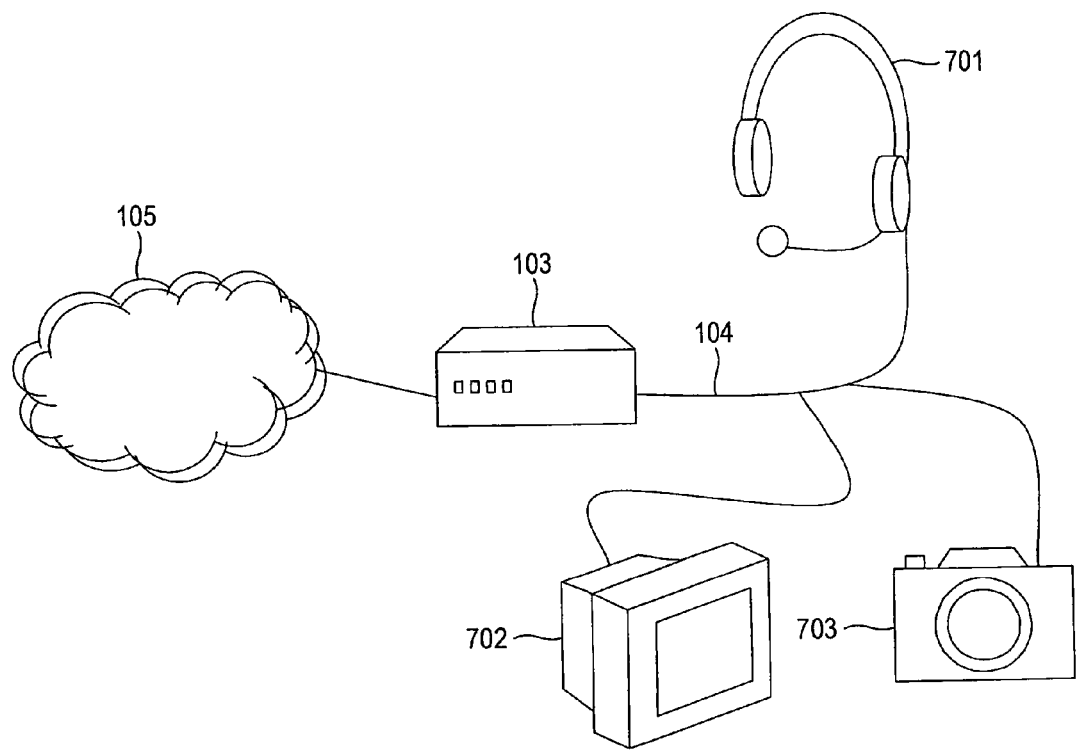
FIG. 7 is a drawing to show a configuration example of a real-time communication system of a third embodiment.

FIG. 7 is a drawing to show a configuration example of a real-time communication system of the third embodiment of the invention. FIG. 7 shows a headset 701, a display 702, a camera 703, a connection control apparatus 103, a home LAN 104, and the Internet 105.

The headset 701 includes a headphone and a microphone that can be connected to a network, for example.

The display 702 includes a display screen such as a CRT that can be connected to a network, for example.

The camera 703 has a function of transmitting an image through the home LAN 104. The camera 703 can capture moving pictures and send video stream from among kinds of media.

The connection control apparatus 103 allots IP addresses (internet protocol addresses) to the headset 701, the display 702, and the camera 703, respectively, in accordance with DHCP (dynamic host configuration protocol).

Figure 10:
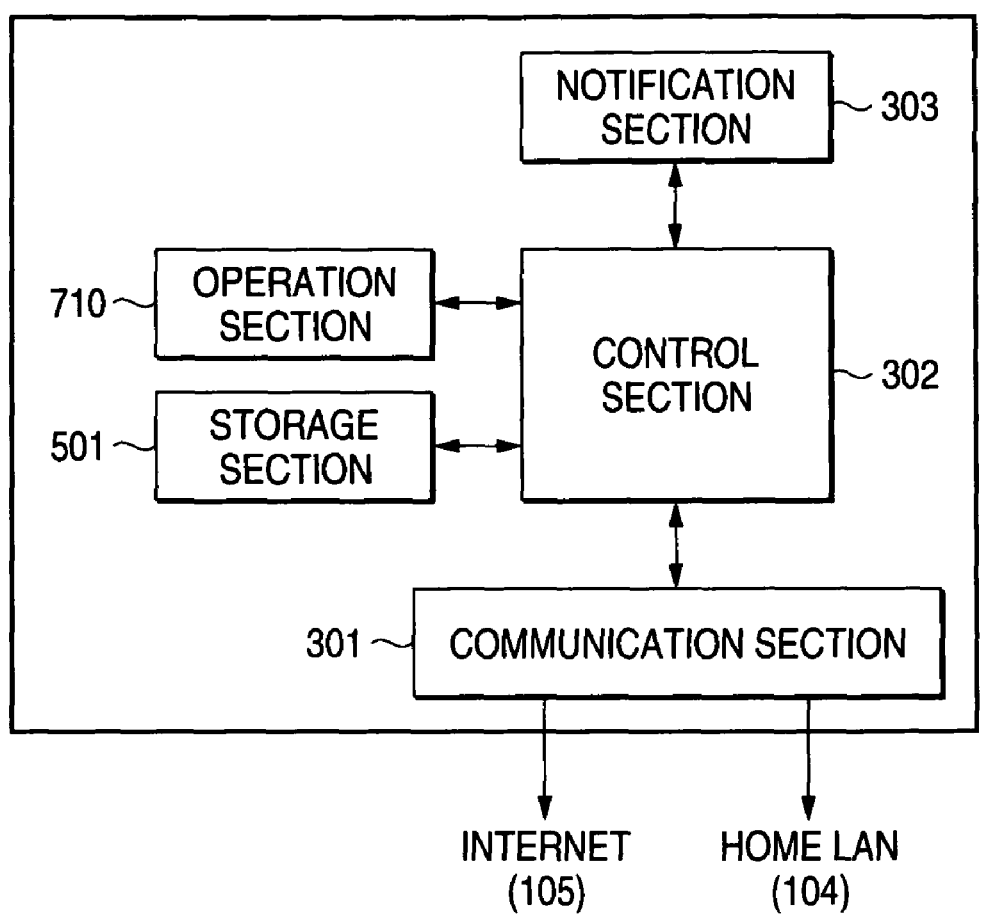
FIG. 10 is a block diagram showing an example of the connection control apparatus of the third embodiment.

FIG. 10 is a block diagram showing an example of the connection control apparatus 103 of the third embodiment. The connection control apparatus of the third embodiment further has an operation section 710 as well as the configuration of the connection control apparatus 103 of the second embodiment.

When the fact that a calling will be accepted is input to the operation section 710, the operation section 710 makes the control section 302 perform an accepting operation. Specifically, the control section selects a kind of medium used in the called communication terminal from among plural kinds of media, which are proposed by the calling communication terminal, and answers to the calling communication terminal on the basis of the selection result. For example, the operation section 710 may be an instruction button, which a user operates directly. Alternatively, the operation section 710 may interpret an instruction sent from another communication terminal connected to the home LAN, as an instruction that the call shall be accepted.

The storage section 501 stores the fact that the headset 701, the display 702 and the camera 703 make up a pair of television conference set. Specifically, the storage section 501 stores a URI-IP conversion table in which information associating one SIP-URI (SIP-uniform resource identifier) with three IP addresses of the headset 701, the display 702 and the camera 703.

Each of the headset 701, the display 702, and the camera 703 can accept a call from a caller (can call in) and can communicate with the caller separately. However, for example, considering communications wherein voice, image, and image pickup must be in association with each other as in a videoconference, if each component accepts a call separately, it may be impossible to conduct intended complete real-time communications.

When the connection control apparatus 103 receives a call to any of the devices through the Internet 105, the connection control apparatus 103 can examine receiving devices of this call and send the call to communication terminals of the respective called parties. Specifically, the control section 302 transfers the call to all communication terminals (whose IP addresses correspond to URI included in the call), which can participate in the call after the call is established, while referencing to the URI-IP conversion table stored in the storage section 501. If communication with any of the plural called communication terminals is established in response to this call, the connection control apparatus 103 relays the communication between the calling communication terminal and a communication terminal, which can accept the call after the communication is established. In contrast, when the headset 701 calls for a communication terminal on the Internet 105, the connection control apparatus 103 transfers the call and relays the communications with the communication terminal. Specifically, the control section 302 transmits the URI, which includes the call and corresponds to an IP address of the calling communication terminal, to a communication terminal, which is indicated by the call, on the Internet while referencing to the URI-IP conversion table stored in the storage section 501.

Further, the connection control apparatus 103 monitors the status of each of the headset 701, the display 702, and the camera 703, to determine as to whether or not each of those devices can accept a call from a different communication terminal. When the connection control apparatus 103 receives a call and the control section 302 determines that a called communication terminal cannot accept the call, the control section 302 notifies, with using the notification section 303, a user that the connection control apparatus 103 receives the call.

The home LAN 104 is a communication medium for communicating with devices such as the headset 701, the display 702, and the camera 703 installed at home. For example, the home LAN 104 may be a network connected by a wired LAN. The home LAN 104 is not limited to the examples mentioned here; it may be a radio LAN conforming to IEEE 802.11b standard or a radio LAN of any other standard if it enables the connection control apparatus 103 and the home communication terminal to communicate with each other.

The Internet 105 is assumed to be a wide-area network that can be used by anyone, but may be a network such as an intracorporate LAN.

Figure 8:
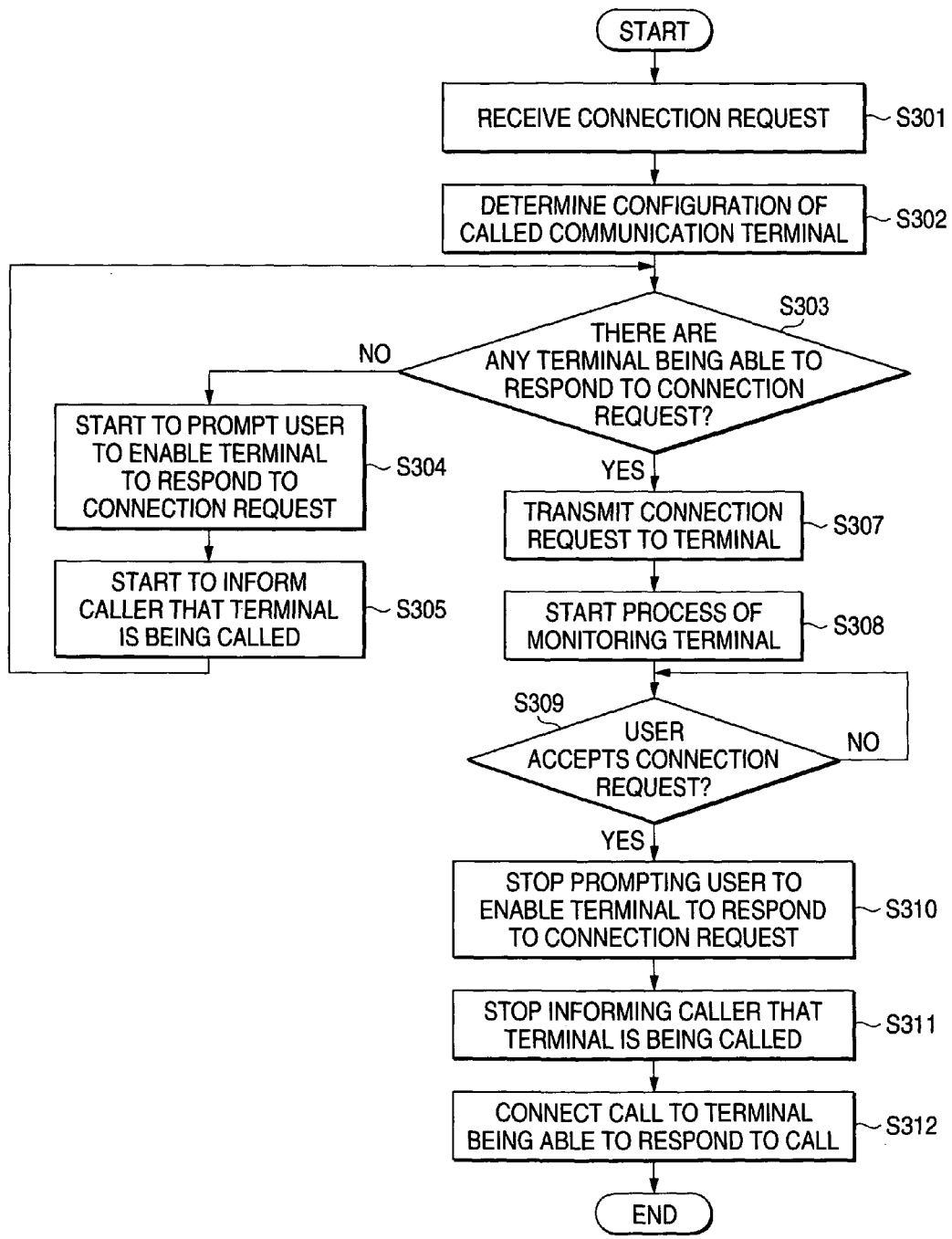
FIG. 8 is a drawing to show an example of a flowchart of a connection control apparatus of the third embodiment.

FIG. 8 is drawings to show an example of a flowchart of the connection control apparatus 103 in the third embodiment.

First, the communication section 301 receives a connection request from any communication terminal on the Internet 105 (step S301). The control section 302 analyzes the connection request and determines a called communication terminal (step S302). Specifically, the control section 302 transfers the connection request to a communication terminal to which an IP address corresponding to URI included in the connection request is allotted, while referencing to the URI-IP conversion table stored in the storage section 501. If the communication terminal determined based on the URI included in the connection request is improbable, that is, the URI included in the connection request or an IP address corresponding thereto is not stored in the URI-IP conversion table, the connection control apparatus 103 may respond to and request the calling communication terminal to cancel the connection request. Next, whether or not respective communication terminals included in one group of television conference set determined from the URI included in the connection request can respond to the call request is determined based on the monitoring result of the control section 302 (step S303). The possible state of each communication terminal monitored by the control section 302 includes a state as to whether the communication terminal is connected to the network in the physical layer in the used communication medium, whether the called communication terminal responds to a signal sent thereto for confirmation, whether or not applications corresponding to respective kinds of media are ready, etc., for example.

If it is determined at step S303 that all the communication terminal included in the one group of television conference set determined from the connection request cannot respond to the call (No at step S303), a notification section 303 begins to draw the user's attention so that the called communication terminal is made to be able to respond to the call (step S304). Specifically, the notification section 303 lights the lamp or causes the beeper to sound for notifying the user that the communication terminal cannot respond to the call although the connection request is made. The user knowing the fact may recognize the reason why the communication terminal cannot respond to the call request and may perform operation of turning on the power, starting up the application, etc. Preferably, the communication terminal has a function of automatically turning on the power such as Wake on LAN. In this case, by sending a start-up instruction from the communication section 301 to the communication terminal, the communication terminal can be reliably placed in a respondable state without the intervention of the user.

It is begun to notify the caller (a communication terminal on the Internet 105, which a calling person is used) that the called communication terminal is being called at present (step S305). The connection control apparatus 103 waits until any of the called communication terminals included in the one group of television conference set becomes able to respond to the call (return to the step S303 again). When the control section 302 detects that any of the called communication terminal included in the one group of television conference set becomes able to respond to the call request (Yes at the step S303), the control section 302 transmits to the communication terminal becoming able to respond to the call request, the connection request in a medium, which the communication terminal becoming able to respond to the call request can handle, from among media of the connection request (step S307). s Next, a process of monitoring a communication terminal, which has already been unable to respond to the connection request, is started (step S308). When there is a communication terminal being unable to respond to the connection request, the notification section 303 continues to draw the user's attention so that the communication terminal is made to be able to respond to the call request as with the step S304. Incidentally, if there is no communication terminal being unable to respond to the connection request, the notification section 303 may be stopped. When a communication terminal does not have means for notifying a user of call-in, the notification section 303 may continue to draw the user's attention.

The connection control section 103 waits until an instruction of user's acceptance to the communication request is input thereto from an instruction button or another communication terminal connected to the home LAN 104 (No at step S309).

When the instruction of user's acceptance to the communication request is input from an instruction button or another communication terminal connected to the home LAN 104 (Yes at step S309), the connection control section 103 stops the notification section 303 to stop drawings the user's attention (step S310).

Then, the connection control apparatus 103 stops notifying the caller that the called communication terminal is being called at present (step S311).

Then, the connection control apparatus 103 generates session with the communication terminal able to respond to the call request at present in a medium, which such a communication terminal can handle.

The connection control apparatus 103 performs connection control as describe above.

Figure 9:
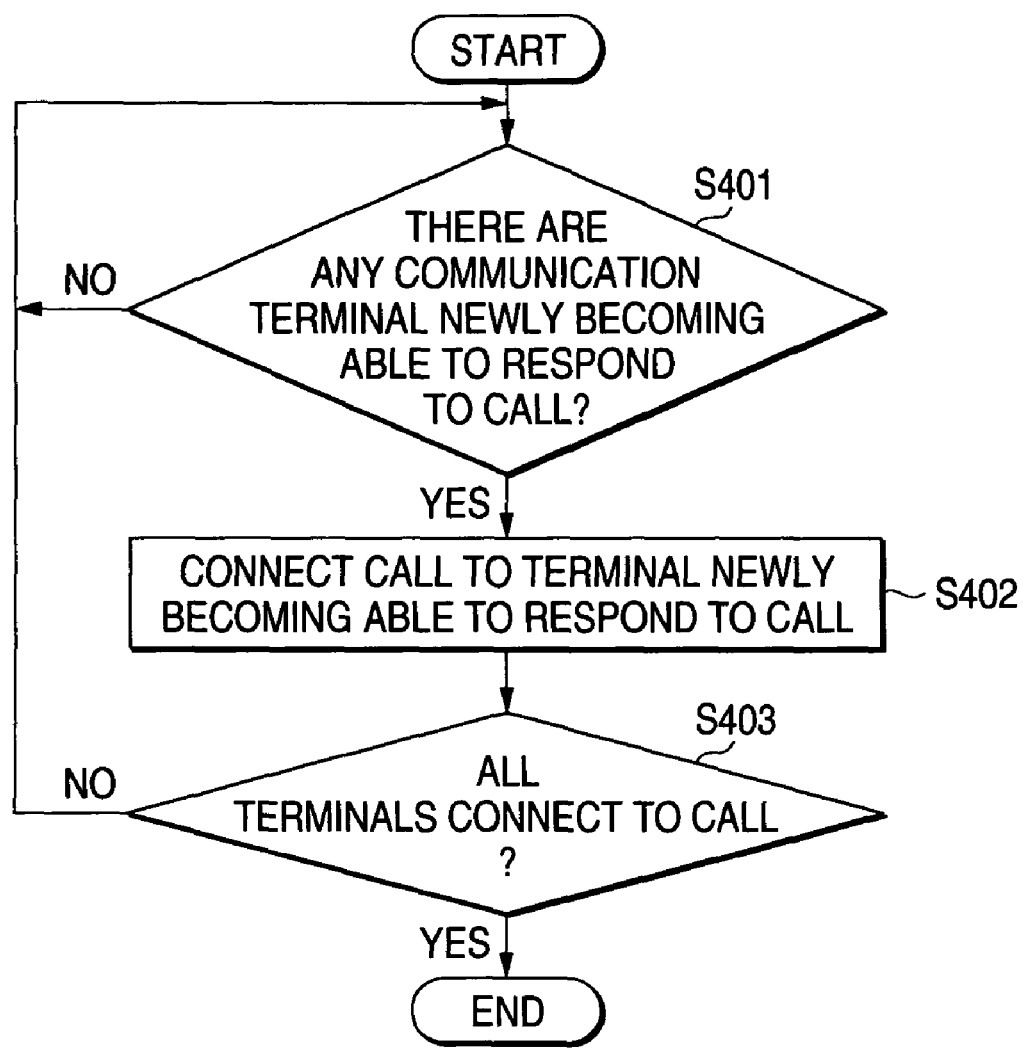
FIG. 9 is a drawing to show a continuation of the flowchart of the connection control apparatus of the third embodiment.

FIG. 9 is drawings to show an example of a flowchart of a process in which the connection control apparatus 103 monitors a communication terminal unable to respond to a connection request.

At first, the control section 302 determines based on the monitoring result of the control section 302 whether the respective plural communication terminals included in the one group of television conference set determined from the connection request are still unable to respond to the connection request or newly become able to respond to the connection request (step S401). If there is no communication terminal newly becoming able to respond to the connection request (No at step S401), the control section 302 waits until a communication terminal newly becoming able to respond to the connection request is detected. If a communication terminal newly becoming able to respond to the connection request is detected (Yes at step S401), the communication control apparatus 103 correct the session between the communication control apparatus 103 and the communication terminal on the Internet 105, to add medium which the communication terminal newly becoming able to respond to the connection request can handle (step S402). For example, when the communication control apparatus 103 has had audio session with the headset 701, the display 702 and camera 703 handling video stream newly become able to responds to the connection request, which falls within this situation. In this case, the communication control apparatus 103 requests the correction of the session to the communication terminal on the Internet 105. When the communication terminal on the Internet 105 accepts the correction of the session in response, a connection request in medium of video stream transmission is transmitted to the camera 703, and a connection request in medium of video stream reception is transmitted to the display 702. When an instruction is issued to accept the respective connection requests transmitted to the display 702 and the camera 703, session between the communication terminal on the Internet 105 and the headset 701, the display 702 and the camera 703 is generated. As a result, conference, which was started only with audio through the headset 701, becomes complete television conference with images.

Then, the control section 302 determines based on the monitoring result of the control section 302 whether or not all the plural communication terminals included in the one group of television conference set determined from the connection request become able to respond to the connection request (step S403). If there is a communication terminal still unable to respond to the connection request (No at step S403), the process returns to step S401 to monitor whether the respective communication terminals are able or unable to respond to the connection request, again. If all the communication terminals are able to respond to the connection request (Yes at step S403), the process for monitoring the communication terminal unable to respond to the connection request is terminated.

According to the configuration described above, even if a communication terminal is not always in a standby state, the user is notified of a call (connection request) so as to enable connection. Therefore, the user can respond to a call made at irregular intervals in real time. Also, even if a part of communication terminals can respond to a call (connection request), the call is connected with using the part of communication terminals able to respond thereto and communication is started early as required.

It is to be understood that the invention is not limited to the embodiments described above and that the invention can be embodied with components modified without departing from the spirit and scope of the invention. The invention can be embodied in various forms according to appropriate combinations of the components disclosed in the embodiments described above. For example, some components may be deleted from all components shown in the embodiment. Further, the components in different embodiments may be used appropriately in combination.

For example, in the embodiment, the connection control apparatus 103 allots IP addresses to the headset 701, the display 702 and the camera 703. However, another device not shown, which is connected to the headset 701, the display 702, the camera 703 and the connection control apparatus 103, may allot IP addresses. Alternatively, IP addresses may be allotted to respective devices fixedly without using DHCP.

Furthermore, a protocol other than TCP/IP (transmission control protocol/internet protocol), which uses IP address, may be adopted.

What is claimed is:

1. A connection control apparatus comprising:
    a monitoring unit configured to monitor a plurality of statuses of a first communication terminal;
    a determining unit configured to determine, on a basis of a monitoring result, as to whether or not the first communication terminal is able to respond to a connection request destined therefor;
    a transferring unit configured to receive the connection request and, when the connection request is destined for the first communication terminal, to transfer the connection request destined for the first communication terminal to the first communication terminal when the transferring unit has received the connection request and the determining unit determines that the first communication terminal is able to respond to the connection request; and
    a notifying unit configured to, when the transferring unit has received the connection request destined for the first communication terminal and the determining unit determines that the first communication terminal is unable to respond to the connection request, notify the first communication terminal to change the status to being able to respond to the connection request,
    wherein the transferring unit is configured to, when the connection request received by the transferring unit is destined for a plurality of communication terminals including the first communication terminal, hold transferring the connection request to the first communication terminal being determined to be unable to respond to the connection request and to transfer the held connection request to the first communication terminal after the first communication terminal changes the status to being able to respond to the connection request.

2. The connection control apparatus according to claim 1, wherein when the transferring unit has received the connection request destined for the first communication terminal and the determining unit determines that the first communication terminal is unable to respond to the connection request, the notifying unit calls attention of a user around the connection control apparatus that the connection request destined for the first communication terminal is not established.

3. The connection control apparatus according to claim 1, wherein the connection control apparatus controls connection requests destined for respective communication terminals in a communication system in which one communication terminal makes a connection request destined for another communication terminal.

4. The connection control apparatus according to claim 1, wherein:

when the transferring unit has received the connection request destined for the first communication terminal and the determining unit determines that the first communication terminal is unable to respond to the connection request destined therefor, the transferring unit holds the connection request destined for the first communication terminal; and when the transferring unit has held the connection request destined for the first communication terminal and the determining unit determines that the first communication terminal is able to respond to the connection request, the transferring unit transfers the held connection request to the first communication terminal.

5. The connection control apparatus according to claim 1, further comprising:
    an identification-information acquiring unit configured to receive the communication request destined for the first communication terminal, when the transferring unit has received the connection request destined for the first communication terminal and the determining unit determines that the first communication terminal is unable to respond to the connection request, the identification-information acquiring unit accepting the connection request destined for the first communication terminal instead of the first communication terminal, acquiring identification information of a caller, and then breaking connection between the identification-information acquiring unit and the caller;
    a storage unit configured to store the acquired identification information of the caller;
    a connection requesting unit configured to make a first call request to the first communication terminal and make a second call request to the caller indicated by the identification information stored in the storage unit, when the determining unit determined that the first communication terminal was unable to respond to the connection request destined therefor and subsequently the determining unit determines that the first communication terminal is able to respond to the connection request destined therefor; and
    a relay unit configured to relay a connection between the connection control apparatus and the caller and a connection between the connection control apparatus and the first communication terminal when the first connection request and the second connection request are accepted.

6. The connection control apparatus according to claim 1, further comprising:
    a storage unit configured to store association information that associates third identification information with first and second identification information, wherein the first identification information is given to the first communication terminal, the second identification information is given to a second communication terminal different from the first communication terminal, and the third identification information is to be used in a connection request to specify an intended destination of the connection request; and
    an identification-information acquiring unit configured to refer to the association information to acquire the first and second identification information corresponding to the third identification information, wherein:
    the monitoring unit further monitors a status of the second communication terminal;
    the determining unit further determines, on the basis of the monitoring result, as to whether or not the first communication terminal and the second communication terminal are able to respond to connection requests destined therefor, respectively;

when the transferring unit has received the connection request destined for the intended destination identified by the third identification information and the determining unit determines that the first communication terminal is able to respond to the connection request destined therefor, the transferring unit transfers the received connection request to the first communication terminal; and when the transferring unit has received the connection request destined for the intended destination identified by the third identification information and the determining unit determines that the second communication terminal is able to respond to a connection request destined therefor, the transferring unit transfers the connection request to the second communication terminal.

7. The connection control apparatus according to claim 6, wherein:

the transferring unit comprises an instruction inputting unit; and when the instruction inputting unit gives an instruction of accepting the connection request including the third identification information associated with the first and second identification information, the connection control apparatus establishes a communication between a caller and at least one of the first and second communication terminals to which the transferring unit has transferred the communication request.

8. The connection control apparatus according to claim 6, wherein when the determining unit has determined that a part of a plurality of communication terminals indicated by a connection request is unable to respond to a connection request destined therefor and subsequently the determining unit determines that at least one of the part of the communication terminals is able to respond to the connection request destined therefor, communication terminals already being connected to a caller are made to start new connection among the connection terminals already connected and the at least one of the part of the connection terminals.

9. A connection control method for controlling a connection request in a communication system, the method comprising:

monitoring a plurality of statuses of a first communication terminal;

determining, on a basis of a monitoring result, as to whether or not the first communication terminal is able to respond to a connection request;

when the connection request is destined for the first communication terminal and the connection request has been received, and it is determined that the first communication terminal is able to respond to the connection request destined therefor, transferring the connection request destined for the connection terminal to the first communication terminal;

notifying the first communication terminal to change the status to being able to respond to the connection request, when the connection request destined for the first communication terminal has been received and it is determined that the first communication terminal is unable to respond to the connection request; and when the connection request is destined for a plurality of communication terminals including the first communication terminal, holding transferring the connection request to the first communication terminal being determined to be unable to respond to the connection request, and transferring the held connection request to the first communication terminal after the first communication terminal changes status to being able to respond to the connection request.

10. A non-transitory computer-readable medium having computer-executable instructions for performing a method to control a connection request in a communication system, the method comprising:

monitoring a plurality of statuses of a first communication terminal;

determining, on a basis of a monitoring result, as to whether or not the first communication terminal is able to respond to a connection request destined therefor;

when the connection request is destined for the first communication terminal and the connection request has been received, and it is determined that the first communication terminal is able to respond to the connection request destined therefor, transferring the connection request destined for the connection terminal to the first communication terminal;

notifying the first communication terminal to change the status to being able to respond to the connection request when the connection request for the first communication terminal has been received and it is determined that the first communication terminal is unable to respond to the connection request; and when the connection request is destined for a plurality of communication terminals including the first communication terminal, holding transferring the connection request to the first communication terminal being determined to be unable to respond to the connection request, and transferring the held connection request to the first communication terminal after the first communication terminal changes status to being able to respond to the connection request.

11. The connection control apparatus according to claim 1, wherein when the transferring unit has received the connection request destined for the first communication terminal and the determining unit determines that the first communication terminal is unable to respond to the connection request, the notifying unit performs operations, other than establishing connection with the first communication terminal, including a Wake on LAN operation to change the status of the first communication terminal.

12. The connection control apparatus according to claim 1, wherein when the transferring unit has received the connection request destined for the first communication terminal and the determining unit determines that the first communication terminal is unable to respond to the connection request, the notifying unit sends the first communication terminal a request for changing the status of the first communication terminal to be able to receive the connection request and the request includes at least one of turning on power and starting an application on the first communication terminal.

13. The connection control apparatus according to claim 1, wherein the plurality of statuses includes at least one of whether power is on and whether an application is running on the first communication terminal.

* * * * *